(12) United States Patent
Parikh et al.

(10) Patent No.: US 8,412,738 B2
(45) Date of Patent: Apr. 2, 2013

(54) PORTABLE INFRASTRUCTURE OBJECT FOR CAPTURING MACHINE IMAGES

(75) Inventors: Prashant Parikh, Holtsville, NY (US); Don Kleinschnitz, Sandy, UT (US)

(73) Assignee: CA, Inc., Islandia, NY (US)

( * ) Notice: Subject to any disclaimer, the term of this patent is extended or adjusted under 35 U.S.C. 154(b) by 163 days.

(21) Appl. No.: 12/906,660

(22) Filed: Oct. 18, 2010

(65) Prior Publication Data
US 2012/0095967 A1    Apr. 19, 2012

(51) Int. Cl.
*G06F 17/30* (2006.01)

(52) U.S. Cl. ........ 707/791; 707/601; 707/602; 707/608; 707/802; 707/828

(58) Field of Classification Search ........... 707/600–899
See application file for complete search history.

(56) References Cited

U.S. PATENT DOCUMENTS

| | | | |
|---|---|---|---|
| 6,370,646 B1 | 4/2002 | Goodman et al. | |
| 7,356,816 B2 | 4/2008 | Goodman et al. | |
| 7,475,098 B2 | 1/2009 | Patterson et al. | |
| 8,209,680 B1 * | 6/2012 | Le et al. | 717/174 |
| 2008/0104107 A1 * | 5/2008 | Schwaab et al. | 707/102 |

* cited by examiner

*Primary Examiner* — Isaac M Woo
(74) *Attorney, Agent, or Firm* — Myers Bigel Sibley & Sajovec, P.A.

(57) ABSTRACT

A method for capturing an image of a machine having one or more disks is presented. The method comprises creating a snapshot of the machine, the snapshot including full machine encapsulation, querying the one or more disks on the machine to obtain information stored thereon, creating metadata able to access one or more files, one or more folders, and the application on the machine, and capturing the snapshot, the obtained information and the metadata in the image. The method may also comprise migrating the captured image and/or extracting one or more files and/or folders from the captured image on another machine. The migration can be between physical and physical, physical and virtual, physical and cloud, etc. The method may comprise capturing another image comprising the snapshot, the metadata and changed information different from the obtained information.

18 Claims, 2 Drawing Sheets

PORTABLE INFRASTRUCTURE OBJECT FOR CAPTURING MACHINE IMAGES

FIELD

The present disclosure relates generally to computer systems, backup and recovery systems, and more particularly to capturing, migrating and recovering machine images.

BACKGROUND

The process of migrating data and applications from one machine or server to another is quite cumbersome. Migration of a system typically involves moving information between a variety of different locations, including migrating from physical to virtual, physical to physical, physical to cloud, one location to another, etc. Migration requires capturing all of the information about the machine and its applications, including layouts, drive letters, application information, data, and more, and transporting this captured information to another system.

System backup has similar issues, in that it requires the ability to capture all of the information about a server, its applications and its data. Backup, however, does not usually require transportation to another system. Whether or not transportation of the data is required, capturing all of this information is not a trivial thing.

At present, the information capture process for migration and/or system backup is performed manually or with minimal automation, wherein a user provides and/or approves a list of elements, such as data and applications, to be captured, stored and transported. There is a need simplify the information capturing process, along with the ability to move a machine and its applications with the data to another location (virtual, cloud, physical). In addition, a simplified process can enable backup and retrieval of a subset of data and/or files, in the situation in which the entire server does not need to be recreated.

BRIEF SUMMARY

A method and system for capturing machine images, that is, the entire server's data and metadata, in a set of files is presented. This captured data or machine image can collectively be called a Portable Infrastructure Object ("PIO"). The PIO is hardware independent. The format of the PIO is the same and transparent across physical and virtual servers.

A method for capturing an image of a machine is presented. The method comprises creating a snapshot of the machine, the snapshot including full machine encapsulation, querying one or more disks on the machine to obtain information stored thereon, creating metadata able to access one or more files, one or more folders, and the application(s) on the machine, and capturing the snapshot, the obtained information and the metadata in the image.

In one aspect, the captured image is migrated from the machine to an other machine. In one aspect, the machine and the other machine are either physical, virtual and/or cloud machines. In one aspect, the captured image can be emailed to a user. In one aspect, another image which comprises the snapshot, the metadata and changed information different from the obtained information is captured.

A system for capturing an image of a machine is also presented. The system comprises a processor on the machine, one or more disks on the machine and a module operable to create a snapshot of the machine, the snapshot including full machine encapsulation, query the one or more disks to obtain information stored on the one or more disks, create metadata able to access one or more files, one or more folders, and one or more applications on the machine and capture the snapshot, the obtained information and the metadata in the image.

In one aspect, the machine and the other machine are either physical, virtual and/or cloud machines. In one aspect, the captured image can be emailed to a user. In one aspect, the module also captures another image which comprises the snapshot, the metadata and changed information different from the obtained information.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
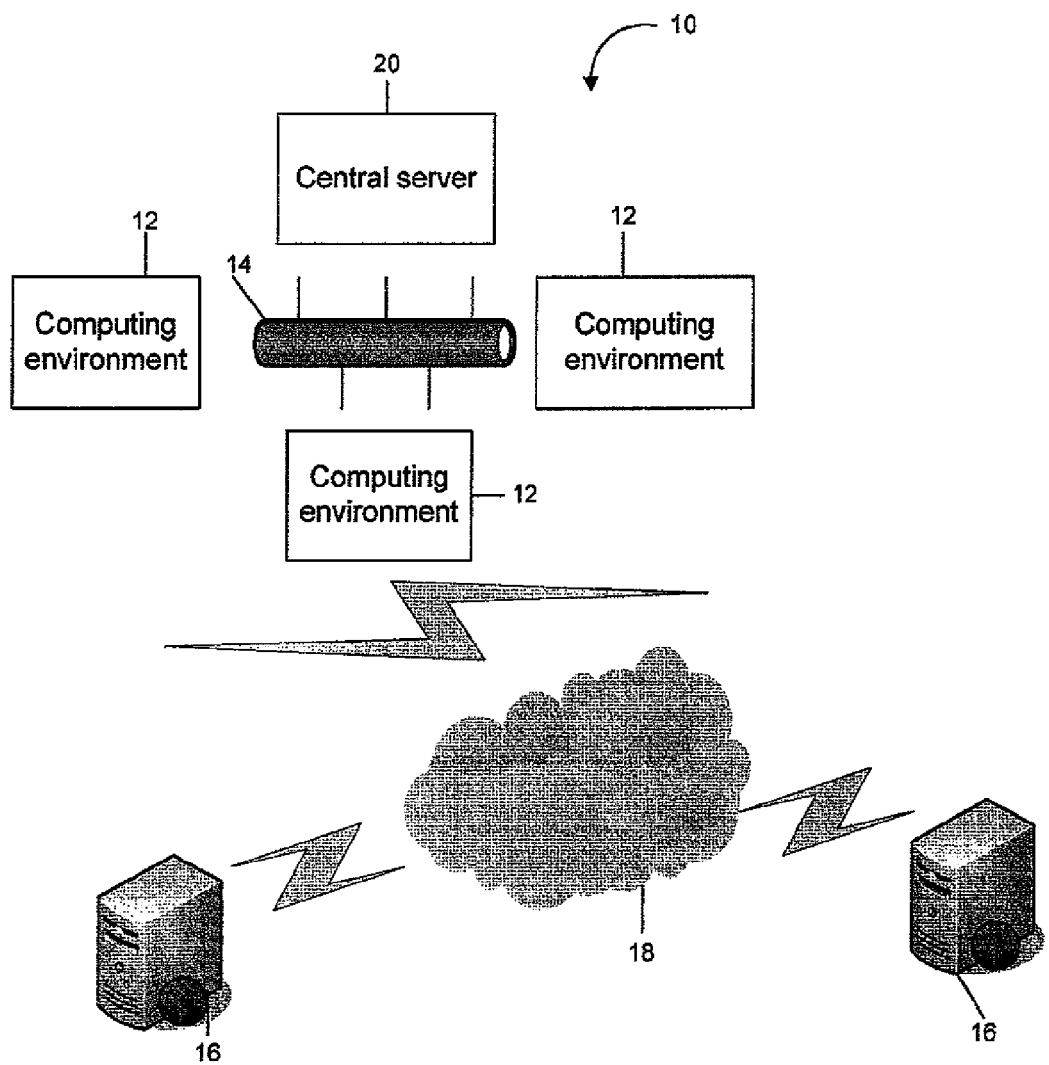
FIG. 1 is a block diagram of a computer network infrastructure in one embodiment of the present invention.

An inventive system and method for capturing machine images with the ability to migrate and recover the images and/or a portion of the images is presented. FIG. 1 is a block diagram of a computer network infrastructure 10 suitable for use with the present invention. As shown in FIG. 1, a variety of computing environments or servers 12 are interconnected by a network 14 or a series of networks. Also, there may be computing environments 16 that may be communicatively coupled by an alternative communications medium 18. A central server or managing platform 20 may include large amounts of database memory that stores computer programs for managing the operation and configuration of the computing environments 12 and the network infrastructure 10. In one embodiment, this central server 20 hosts the migration method and system of the present invention.

Typically, a computing environment or server 12, 16 executes a particular application. Each computing environment 12, 16 can be a working combination of hardware including input/output devices, processors, monitors, etc., software including programs, applications, operating systems, etc., and data communication devices. Some or all of the servers 12, 16 can include database memory which may employ a database management system, such as a relational database management system (RDBS) to manage data input and stored in the memory locations.

The inventive system and method can enable continuous information capture and can create the PIO on an incremental basis, which allows the size of each individual PIO to be contained. Each incrementally created PIO is linked to its parent, which provides the ability to continuously capture incremental changes (at block level) on physical and virtual servers 12, 16.

The PIO will be application consistent and will enable the user to recreate the entire machine from any incremental PIO. Hence all the data for each application is consistent or valid as of the last, most recent transaction so that no rollback or manual recovery is needed at the time of the restore and/or recovery performed using the PIO. Thus the user can implement the entire machine elsewhere, convert it to virtual, convert it to cloud, etc.

Figure 2:
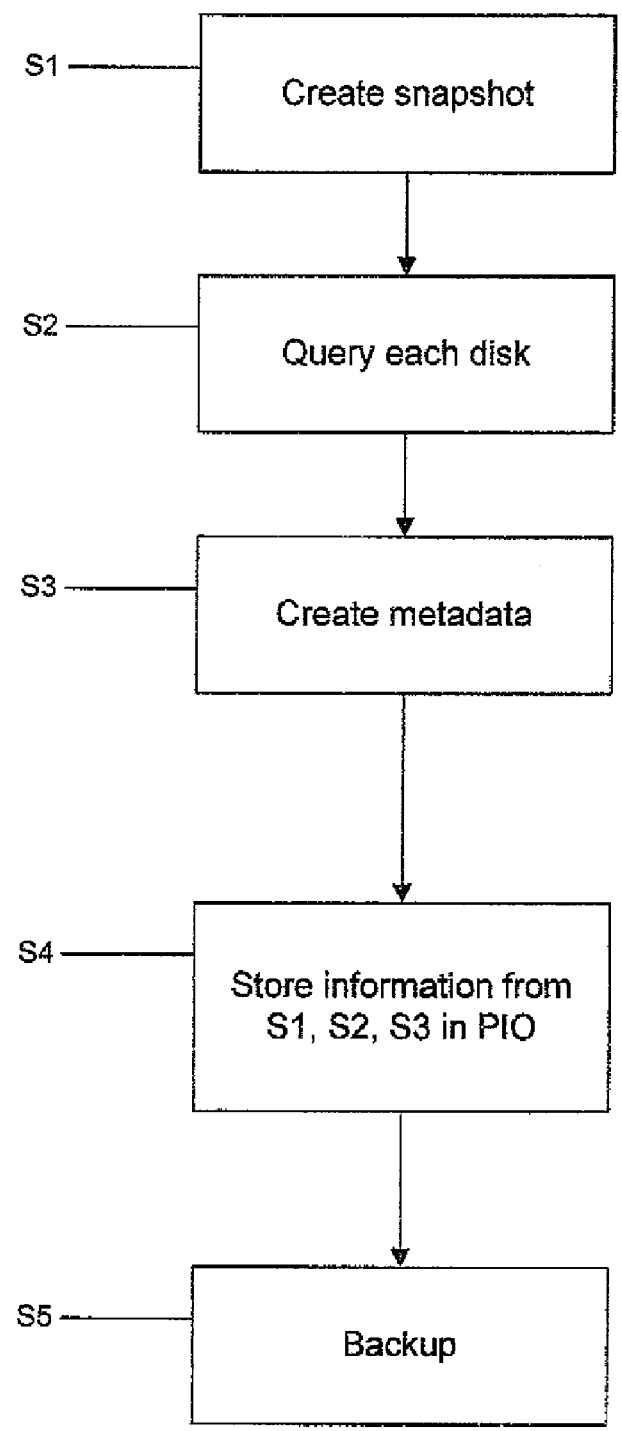
FIG. 2 is a flow diagram of the method in accordance with one embodiment of the present invention.

FIG. 2 is a flow diagram of the inventive method. In step S1, a snapshot of the machine 12, 16 is created. Any software that can pause all data input and output for a brief period of time can be used to create the snapshot. An example of snapshot software is Microsoft® VSS. The snapshot contains full machine encapsulation which includes, but is not limited to, the configuration of the machine 12, 16, the registry, the disk layouts, drivers, etc. Note that full encapsulation includes more information than just selective files and registry data.

In step S2, a query for each disk and its information is performed. Performance of the query includes collecting all the information about the application(s), disk(s) and/or volumes. The information describes how the data is laid out, the components of each application and the disk(s) layout(s).

In step S3, metadata is created to be able to access the files, e.g., data, and/or folders and/or applications on the machine 12, 16. The metadata is incorporated into the snapshot. The metadata comprises information about the system and its components. This information is used for recovering the entire machine, either to the same or an alternate hardware and/or cloud. The information can also be used for recovering one or more individual files and/or folders and/or applications from the PIO. The information is typically stored as a set of files and is used for different recovery operations as described above.

In step S4, the information from steps S1 through S3 is stored in a PIO. Upon completion of step S4, the PIO contains the snapshot, information from each disk and metadata enabling access to the information including files, folders, and/or applications on the machine 12, 16. This PIO is hardware independent.

In step S5, a backup of the machine is performed using the snapshot, to populate the PIO. The initial backup to create the PIO can be a full machine backup which can be performed only once. Incremental backups are usually created after the initial one. In the incremental backups, only the changed blocks can be backed up. Note that steps S2 and S3 are performed whether a full or incremental backup is performed.

Advantageously, once a PIO is made out of a server, this server's data and application(s) can be resurrected and/or activated anywhere in the world, including in virtual, physical, and/or cloud systems. The activation can be performed across different hardware and the server can be migrated across physical and/or virtual systems.

Beneficially, using the PIO, users can migrate between physical, virtual and cloud environments easily without losing any data. Further, the end user can extract any data (file, folder, application data, etc.), without the need for migrating the entire server, either physically or virtually. Thus, a server can be created or configured in one location and the entire server or parts or portions of it can be extracted in another location.

With the PIO, the users can provision servers (of the same logical configuration) very easily.

The PIO can be e-mailed, so that an entire server, including files, drivers, etc., can be sent electronically. In addition, once the PIO is created, it can be used at a later point in time.

Accordingly, the inventive system and method can capture and store an entire machine or server as an object that is hardware independent. Then a user can recreate the machine "anywhere", such as in cloud, in a virtual space, in another physical location, with different hardware, etc. In addition, the user can extract specific data and/or details from the server, instead of recreating the entire server.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for capturing an image of a machine, comprising:

creating a snapshot of the machine, said snapshot including full machine encapsulation;

querying one or more disks on the machine to obtain information stored on the one or more disks;

creating metadata able to access one or more files, one or more folders, and one or more applications on the machine; and capturing the snapshot, the obtained information and the metadata in the image, wherein the image is a hardware-independent transferrable object, and wherein capturing comprises:

performing a backup of the machine using the snapshot; and storing the backup of the machine, the snapshot, the information stored on the one or more disks, and the metadata in the object.

2. The method according to claim 1, wherein the captured image is migrated from the machine to another machine.

3. The method according to claim 2, wherein the machine is one selected from the group consisting of a physical machine, a virtual machine, and a cloud, and the another machine is one selected from the group consisting of another physical machine, another virtual machine, and another cloud.

4. The method according to claim 1, wherein one selected from the group consisting of the one or more files and one or more folders is extracted from the captured image on another machine.

5. The method according to claim 1, wherein the captured image is emailed to a user.

6. The method according to claim 1, further comprising:

capturing another image comprising the snapshot, the metadata and changed information different from the obtained information.

7. A computer program product for capturing an image of a machine, comprising:

a computer readable storage medium having computer readable program code embodied in the medium, the computer readable program code comprising:

computer readable program code to create a snapshot of the machine, said snapshot including full machine encapsulation;

computer readable program code to query one or more disks on the machine to obtain information stored on the one or more disks;

computer readable program code to create metadata able to access one or more files, one or more folders, and one or more applications on the machine; and computer readable program code to capture the snapshot, the obtained information and the metadata in the image, wherein the image is a hardware-independent transferrable object, and wherein the computer readable program code to capture further comprises:

computer readable program code to perform a backup of the machine using the snapshot; and computer readable program code to store the backup of the machine, the snapshot, the information stored on the one or more disks, and the metadata in the object.

8. The computer program product according to claim 7, wherein the captured image is migrated from the machine to another machine.

9. The computer program product according to claim 8, wherein the machine is one selected from the group consisting of a physical machine, a virtual machine, and a cloud, and the another machine is one of another physical machine, another virtual machine, and another cloud.

10. The computer program product according to claim 7, wherein one selected from the group consisting of the one or more files and one or more folders is extracted from the captured image on another machine.

11. The computer program product according to claim 7, wherein the captured image is emailed to a user.

12. The computer program product according to claim 7, further comprising:

computer readable program code to capture another image comprising the snapshot, the metadata and changed information different from the obtained information.

13. A system for capturing an image of a machine, comprising:

a processor;

one or more disks; and a module to create a snapshot of the machine, said snapshot including full machine encapsulation, to query the one or more disks to obtain information stored on the one or more disks, to create metadata able to access one or more files, one or more folders, and one or more applications on the machine, and to capture the snapshot, the obtained information and the metadata in the image, wherein the image is a hardware-independent transferrable object, and wherein the module is to capture the image by performing a backup of the machine using the snapshot, and storing the backup of the machine, the snapshot, the information stored on the one or more disks, and the metadata in the object.

14. The system according to claim 13, wherein the captured image is migrated from the machine to another machine.

15. The system according to claim 14, wherein the machine is one selected from the group consisting of a physical machine, a virtual machine, and a cloud, and the another machine is one selected from the group consisting of another physical machine, another virtual machine, and another cloud.

16. The system according to claim 13, wherein one selected from the group consisting of the one or more files and one or more folders is extracted from the captured image on another machine.

17. The system according to claim 13, wherein the captured image is emailed to a user.

18. The system according to claim 13, wherein the module is further to capture another image comprising the snapshot, the metadata and changed information different from the obtained information.

* * * * *